United States Patent
Stava et al.

(10) Patent No.: US 6,818,860 B1
(45) Date of Patent: Nov. 16, 2004

(54) PORTABLE WELDER WITH INTEGRAL BATTERY CHARGER

(75) Inventors: Elliott K. Stava, Sagamore Hills, OH (US); William T. Matthews, Chesterland, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/603,259

(22) Filed: Jun. 26, 2003

(51) Int. Cl.[7] .................................................. B23K 9/10
(52) U.S. Cl. .................................... 219/130.1; 320/137
(58) Field of Search ............................. 219/130.1, 133; 320/137

(56) References Cited

U.S. PATENT DOCUMENTS

| | | | |
|---|---|---|---|
| 2,836,736 A | * | 5/1958 | Johnson ....................... 307/155 |
| 2,999,950 A | * | 9/1961 | Johnson ....................... 307/155 |
| 3,227,979 A | * | 1/1966 | Kamp ........................... 336/133 |
| 3,659,183 A | * | 4/1972 | Carlson ........................ 320/105 |

\* cited by examiner

*Primary Examiner*—Clifford C. Shaw
(74) *Attorney, Agent, or Firm*—Fay, Sharpe, Fagan, Minnich & McKee, LLP

(57) ABSTRACT

A portable electric arc welder having a power source creating a DC voltage between two output terminals to drive a welding device and an integrated, internal battery charger with an input stage and an output connectable to a battery to be charged, and a selectable switch having a first position connecting the terminals to the welding device and a second position connecting the terminals to the integrated battery charger.

13 Claims, 4 Drawing Sheets

PORTABLE WELDER WITH INTEGRAL BATTERY CHARGER

The invention relates to the art of electric arc welding and more particularly to a small portable electric arc welder with an integrated, internal battery charger.

BACKGROUND OF INVENTION

In recent years, a secondary marketing strategy by leading manufacturers of electric arc welders has been to sell a large number of small portable electric arc welders used domestically and in small job shops. This expansion of welding capabilities to individuals has greatly increased the arc welding field and has created a situation where many small facilities include capabilities for electric arc welding. Such tremendous increase in the number of electric arc welders being used by individuals has created a demand to enhance the capabilities of these small portable welders so the welders can be used for diverse applications between the occasional use of the welder to actually weld. So far, the ability to diversify the capabilities of portable electric arc welders has not been accomplished, except to provide an auxiliary power outlet. The present invention is an effort to expand the use of a portable electric arc welder.

THE INVENTION

The present invention is an improvement in a portable electric arc welder having an internal power source that creates a DC voltage between two output terminals. A portable electric welder is a small welder of the type that is carried about a shop or garage and has a weight of less than about 100 pounds and is rated at less than about 300 amperes. Indeed, most of the portable electric arc welders, such as the SP series manufactured by The Lincoln Electric Company and sold by the thousands at retail outlets, has a rating of less than 200 amperes. This type of portable electric arc welder sold in retail outlets to individuals is modified to have an integral, internal battery charger. This integrated, internal battery charger is used to charge batteries, such as a 12 volt vehicle battery, using the power source of the welder. In accordance with the invention, the portable electric arc welder appears to be the same and has the same general size as an existing light duty welder. However, the welder is used between occasional welding operations to charge an automobile battery. In accordance with another aspect of the invention, the electric arc welder is also provided with an integral device for rotating an automobile starter. This can be standard terminals of a battery charger or a motor starting device connected to the existing battery of a motor vehicle. In this later situation, a bypass circuit is provided so that when an automobile needs emergency starting, due to a low battery, the welder is capable of being connected to the starting device while bypassing the existing vehicle battery. The main aspect of the present invention is providing an integral battery charger. A secondary aspect of the invention, which mayor may not be incorporated into the portable welder, is the motor starting device driven by the same power source as the welder and the battery charger. Consequently, the standard portable, light duty electric arc welder of the present invention has the capability of charging batteries and, in one implementation, the capability of replacing the existing battery as a means of supplying a high level of DC current. The two added capabilities of the welder are used for lead acid type batteries, such as batteries having a voltage capability of at least about 12 volts DC. These two capabilities are included in a constant voltage type arc welding power supply, which may or may not include a wire feeder as an integral component. This new small portable welder includes a switch to select the welding mode or the battery charging mode. If the third capability is included then the switch includes a battery eliminator mode, i.e. a mode for starting an automobile. The welder has standard positive and negative welding power leads for a gun and cable and a workpiece. The integral starting device includes a separate pair of terminals connected to the terminals of the power source of the welder.

In the welding mode, the welder will operate as a conventional constant voltage arc welder. The internal power source will include the normal electrode and workpiece welding cables. In cases where the wire feeder is an integral part of the power source, the electrode cable will be part of the welding gun and torch. Furthermore, when in the welding mode, the other modes of operation may or may not be electrically turned off or inactive. In the battery charger or battery eliminator modes, a separate pair of terminals, designated positive and negative, are provided for connection to the battery studs. These terminals may be part of the battery charger or separate for connection into the wiring system of a vehicle. Furthermore, in the battery charging mode, a standard 12 volt battery or group of batteries may be charged. Of course, batteries of higher voltage may also be charged by changing the internal charging circuit. The charge voltage is internally selected. In the battery eliminator mode or starting mode, the power source acts like a battery and provides the current needed to start or power various apparatuses, such as the starting motor of a motor vehicle. In one modification when employing this mode of operation of the portable electric arc welder, an additional cable is used. This cable is connected to a specifically designed adaptor or housing permanently attached to the battery. This starting device allows the operation of a starting motor in a motor vehicle by passing current to a starting motor, but not to the battery. This prevents the portable arc welder from adversely affecting the battery when the welder is used to start an internal combustion engine.

In accordance with an aspect of the invention, a standard portable electric arc welder having a power source creating a DC voltage between two output terminals and welding output leads for performing a welding operation is improved by an internal battery charger integrated with the welder. The battery charger utilizes standard battery charging technology and has an input stage connected to the terminals of the power source and output leads connectable to a battery. The battery charger includes a standard charging sequence circuit operable by an input enabling signal. The voltage from the welder to charge the battery in accordance with standard technology is a constant voltage identified by the battery charge. A manual selector switch on the welder is movable between a first position connecting the terminals of the power source to the welding output leads and a second position creating the battery charging input enabling signal. In accordance with another aspect of the invention, a welding gun or torch, with a weld trigger, is connected to one of the output leads and a circuit is provided for operating the power source when both the trigger is closed and the selector switch is in the first position activating the welding mode.

In accordance with another aspect of the invention, the selector switch has a third position to activate an integral actuating device to start a motor vehicle. This device is from the battery charger or is attached to at least one of the output terminals of the power source by a connector. In this case, a circuit is used to close the connector when the selector switch is in the third position. Consequently, when the automobile battery is low, the welder is connected to the starting device to direct starting current to a bypass circuit or through the battery charger to the winding system of the vehicle.

In accordance with another aspect of the invention, a spark inhibitor is provided when the battery operating modes of the welder are used. A large resistor has parallel switch. The switch is closed only when current flow through the resistor is sensed. Thus, if a spark condition exists, the switch will be open and the large resistor is placed in series with the power lead. Another ancillary aspect of the invention is provision of a polarity switch on the output side of the battery operating devices. This polarity switch allows the welding device connected to the output of the portable welder to be manually adjusted between an electrode positive or an electrode negative mode of operation.

The primary object of the present invention is the provision of a small, portable electric arc welder with an integrated, internal battery charger using the same power source for either welding or battery charging.

A further object of the present invention is the provision of a small electric arc welder which has dual capabilities and can be sold to individuals at retail outlets. These and other objects and advantages will become apparent taken together with the accompanying drawings.

PREFERRED EMBODIMENT

Figure 1:
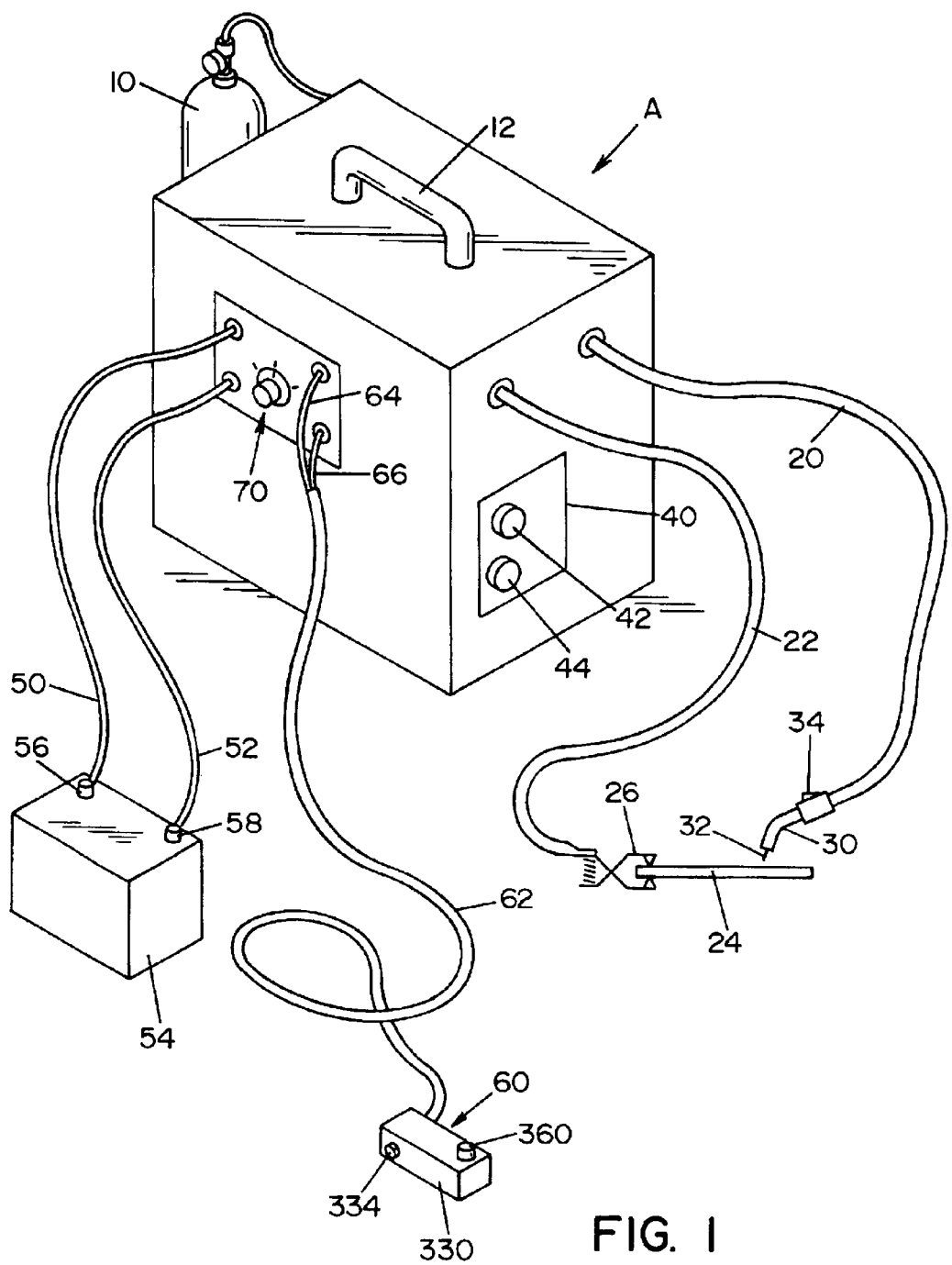
FIG. 1 is a pictorial view of a portable electric arc welder constructed in accordance with the present invention.

Referring now to FIG. 1, a portable electric welder A has a weight of less than 100 pounds and an output rating of less than 300 amperes. Such a welder is a light duty welder, such as an SP series sold by The Lincoln Electric Company of Cleveland, Ohio. This portable electric arc welder has a gas tank 10 and handle 12. Standard welding power leads 20, 22 are provided for welding between a workpiece 24 connected to lead 22 by a standard alligator clamp 26. Welding gun 30 directs welding wire 32 toward workpiece 24 when trigger 34 is depressed to initiate the arc welding process and the wire feeder. In accordance with standard technology, a front panel 40 includes a voltage knob 42 and wire feed speed knob 44. This latter adjustment adjusts the current of the electric arc welder as is known in the trade. As so far described, welder A is standard and is used to weld with wire 32 onto workpiece 24. The improvements of the present invention is the addition of an internal battery charger having external leads 50, 52 connected across the studs 56, 58 of battery 54 which battery is, in practice, a 12 volt automobile battery used to power the ignition system of an internal combustion engine.

Figure 1A:
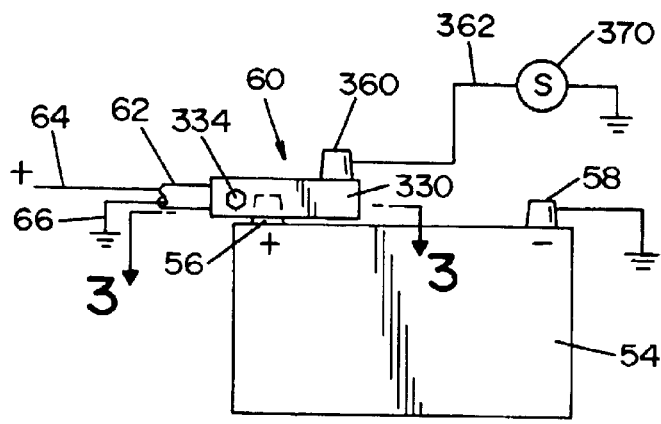
FIG. 1A is a side elevational view of a battery equipped with one embodiment of a motor starting device using one aspect of the present invention.
Figure 3:
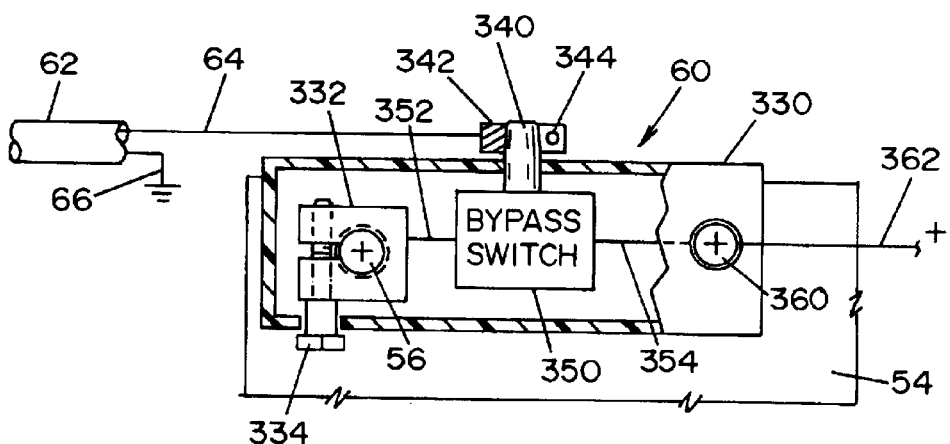
FIG. 3 is a cross-sectional view taken generally along line 3—3 of FIG. 1A and showing the motor starting device utilized in one embodiment of the present invention.

The primary aspect of the present invention is the modification of portable welder A to include an internal battery charger; however, in accordance with another aspect of the invention, a starting device 60 best shown in FIGS. 1A and 3 is connected to welder A by cable 62 having internal positive and negative leads 64, 66, respectively. Device 60 is used on the battery of an internal combustion automobile so welder A, when needed, can be attached to the device for the purposes of starting the automobile, even when battery 54 is low. This is very advantageous in low temperature climates. In another embodiment, the starter current is provided by the standard battery charger circuit. Welder A has a manual selector switch 70, best shown in FIGS. 1, 2 and 1B with mode positions 72, 74, 76, and 78 for shifting welder A between the welding mode, the battery charging mode and the battery eliminator or starting mode and the off position, respectively. A garage or shop having electric arc welder A need not have individual appliances for starting a motor vehicle and charging a battery. Electric arc welder A, between welding operations, is used for these functions.

Figure 2:
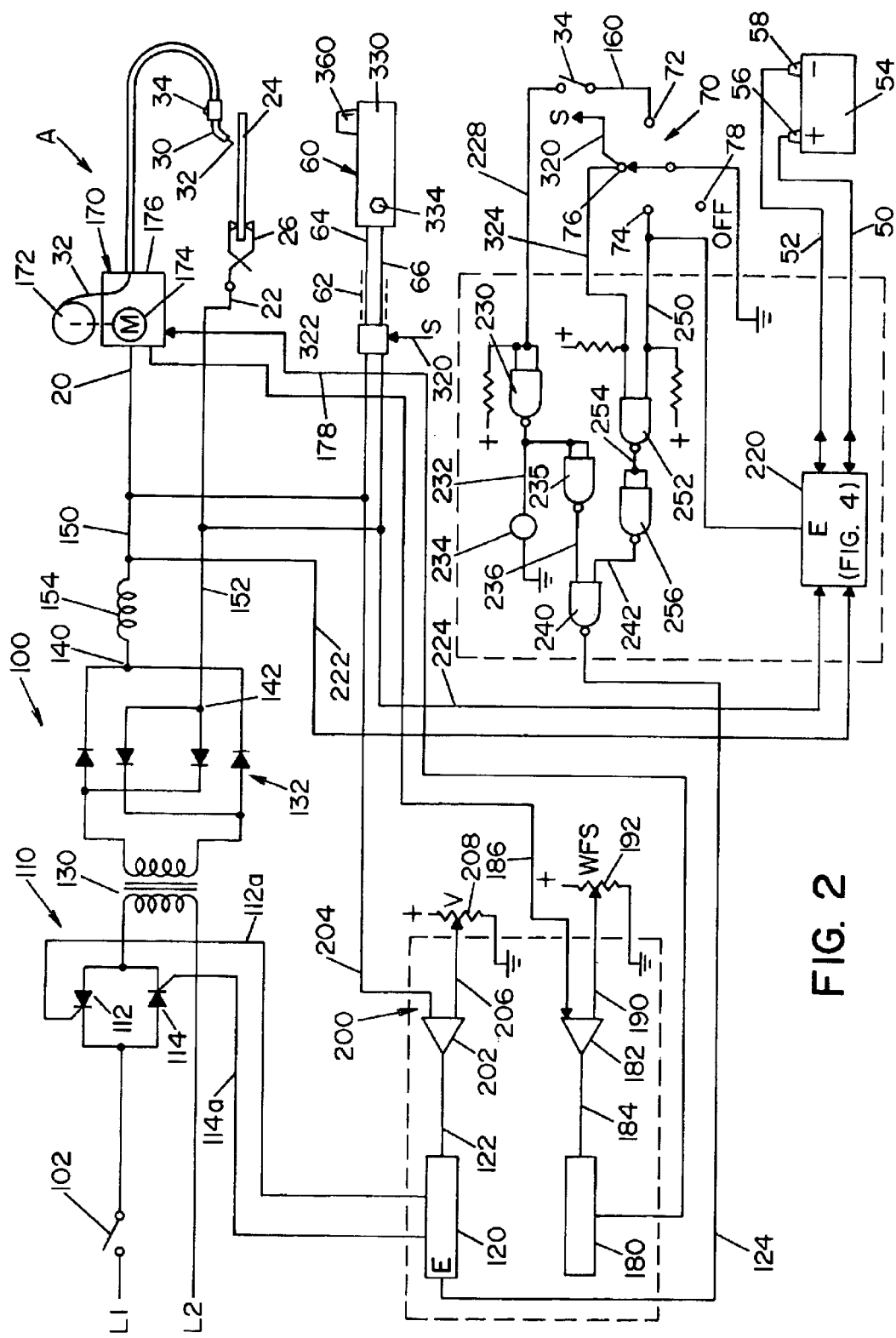
FIG. 2 is a wiring diagram of the preferred embodiment of the present invention.

A variety of electrical wiring diagrams could be used for practicing the present invention; however, a preferred embodiment is illustrated in FIG. 2. The standard operation of welder A will be described before describing the novel features. Power source 100 includes an input switch 102 for connecting lines L1, L2 to high speed switching network 110 of the illustrated type including SCRs 112, 114 with gates 112a, 114a, respectively, having gating pulses from a standard SCR controller 120. The controller has an input 122 which determines the phase angles of the SCRs. This controller is enabled with a logic 1 in line 124. When line 124 has a logic 1, controller 120 operates power source 100 in accordance with the voltage on input line 122. In accordance with standard practice, transformer 130 can use a voltage from network 110 and directs the output to rectifier 132 for creating voltage across terminals 140, 142 and current between these terminals. The output terminals feed current to leads 150, 152 and through choke 154 to smooth out the DC current. Leads 150, 152 are directed to gun 30 and workpiece 24 respectively. A standard internal wire feeder 170 has a reel 172 of welding wire driven by motor 174 in accordance with a signal to controller 176. The speed of the wire feeder is determined by the voltage on input line 178 from wire feed speed controller 180. The wire feed speed and operation of the wire feeder is determined by a comparator 182 having an output 184 operating controller 180 in accordance with the feedback signal in line 186 and a reference signal in line 190. This reference signal is manually adjusted internally of welder A by a grounded potentiometer 192. The position of the potentiometer arm determines the speed of motor 174. The wire feeder is operated when trigger 34 is closed. Welder A is a constant voltage welder having an internal voltage control 200 wherein comparator 202 generates an output voltage in line 122 according to a comparison of the voltage in feedback line 204 and the level of a reference signal in line 206 from a grounded potentiometer 208. Comparator 202 drives line 122 in accordance with standard technology. During operation, the output of comparator 202 controls the signal on line 122. As so far described, welder A operates in accordance with a standard constant voltage welder.

The invention involves modifying welder A by adding an internal, integrated battery charger using power source 100 to charge battery 54. A standard battery charging sequence circuit 220 is operated in accordance with standard technology shown in FIG. 4 to charge battery 54. The condition of the battery is communicated with circuit 220 by lines 50, 52. Power from power source 100 is directed to circuit 220 by lines 222 and 224 from leads 150, 152, respectively. The voltage is the OCV of the constant voltage power source. Battery charge circuit 220 is standard and in the preferred embodiment of the starting addition, circuit 220 also provides a high current to drive motor 370 shown in FIG. 1A.

Any type of manual selector switch and logic network is used for changing from the standard welding operation to the battery charger circuit 220. In the illustrated embodiment, when switch 70 is in position 72, a logic 0 is applied to the welding activating line 160. With the welding operation activated, trigger 34 is closed to apply a logic 0 to input 228 of gate 230. This produces a logic 1 in line 232 to activate gas solenoid 234 for control of gas flow from tank 10. The trigger causes gas flow from tank 10. The logic 1 on line 232 is directed to NAND gate 235 to provide a logic 0 in line 236 at the input of NAND 240. As will be described, when switch 70 is in position 72, a logic 1 appears in line 242 to activate NAND gate 240. A logic 1 in line 242 indicates that the battery charger is not activated. With the welder activated, closing of trigger 34 produces a logic 1 in output line 124. When the trigger is open, a logic 0 is in line 124. Thus, trigger 34 starts operation of the gas by relay or solenoid 234 and activates SCR controller 120 to cause welding. Again, this welding operation is the same as normal operation of a portable welder A.

Figure 4:
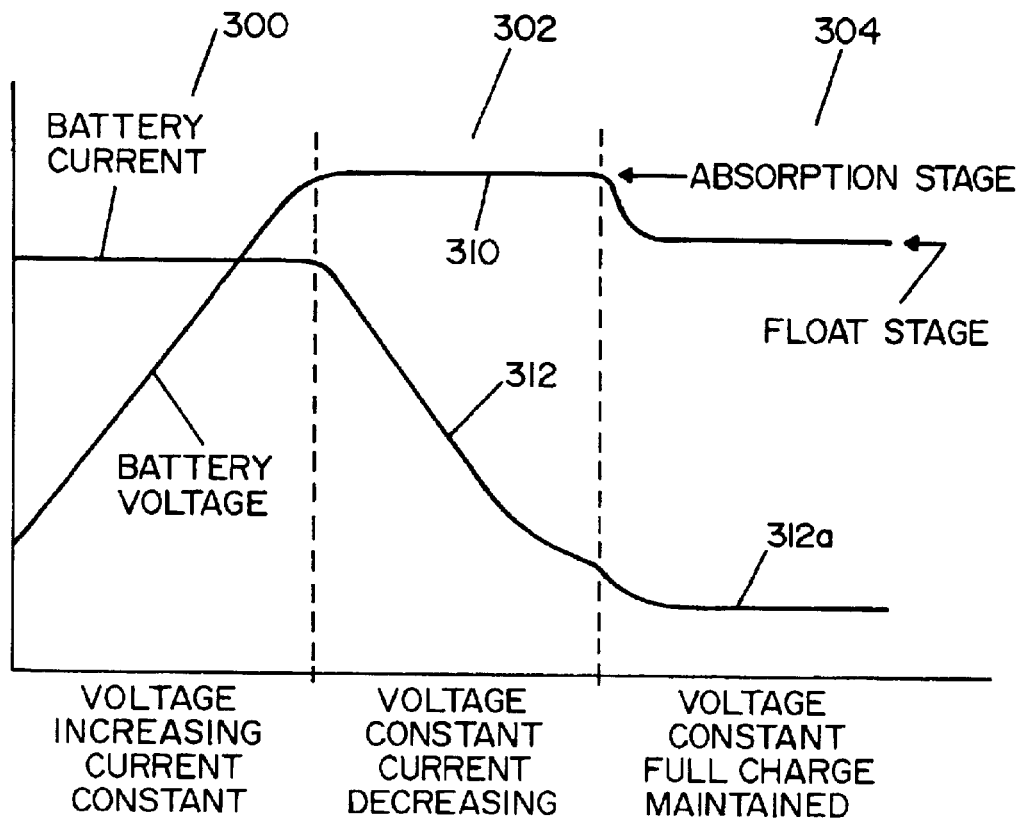
FIG. 4 is a voltage and current graph illustrating the operation of the charging sequence circuit of a standard battery charger as used in accordance with the present invention; and, FIG. 5 is a simplified wiring diagram illustrating the spark inhibitor used in one aspect of the present invention.

When switch 70 is shifted to position 74, welder A is converted to a battery charger through operation of sequencing circuit 220. A logic 0 appears in line 250 at the input of NAND gate 252. This logic 0 produces a logic 1 in line 254 to gate 256. This gives a logic 0 in line 242 and a logic 1 in line 124. This is a constant logic 1 in line 124 and is not interrupted by trigger 34, which is deactivated by switch 70. With switch 70 in position 74, circuit 220 controls power source 110 and the power source is maintained on by the logic 1 in line 124. The operation of circuit 220 is explained in more detail in FIG. 4 wherein the battery charging circuit operates in three stages identified as stage 300, stage 302 and stage 304. The battery voltage is illustrated as graph 310 and the battery current is shown as graph 312. In stage 300, the battery is illustrated as starting in a discharged state. The charging circuit is operated in a constant current mode so that the signal in line 212 takes over from the comparator 202. The charger current is maintained at a constant value in stage 300 and the battery voltage is allowed to rise as it is being charged. Approximately 80% of the battery capacity is returned in this constant current region where controller 120 is controlled by override circuit 214. When the battery voltage reaches approximately 2.4 volts per cell or 14.6 volts for a 12 volt battery, circuit 220 shifts to stage 302, as shown in FIG. 4. The charger voltage is then held constant at the higher level and the battery current is allowed to reduce. In this stage, the voltage from comparator 202 is controlled by the reference signal in line 206. In this stage, the last 20% of the battery capacity is returned during the charging operation by circuit 220. The voltage level is maintained until the battery reduces to approximately C/50 to C/100, where C is the ampere-hour rating of the battery. For instance, if the battery is a 100 ampere-hour battery, the voltage should be maintained at 2.5 volts per cell until the current decreases to 1—2 amperes. This is shown in portion 312a of curve 312. The exact amount of this reduced current is not critical. In stage 304, the charging operation is allowed to float. At this point, the current is reduced to the level 312a and the battery charger merely floats. The float mode is where the voltage on the battery is maintained at approximately 2.25 volts per cell or 13.5 volts for a 12 volt battery. This voltage will maintain the full charge condition of the battery without boiling out electrolyte or over charging the battery. In practice, battery charger circuit 220 normally operates in only stage 300 and stage 302. Thereafter, the battery is disconnected and ready for normal operation. Consequently, circuit 220 functions in accordance with standard technology set forth and explained with respect to the graphs in FIG. 4.

Figure 1B:
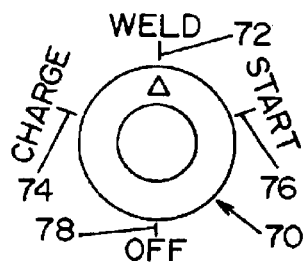
FIG. 1B is an enlarged front view illustrating the selector switch used in accordance with the preferred embodiment of the present invention.

As so far described, welder A is modified to have an internal, integrated battery charger. This is the basic concept of the present invention allowing the welder to function in two separate and distinct modes. In accordance with another aspect of the invention, the welder is also capable of starting an internal combustion engine by operating the starter when battery 54 is low. This is done either by a high current output from battery charging circuit 220 or by a battery mounted device 60. This third mode of operation using device 60 is accomplished by moving switch 70 to position 76 as shown in FIG. 1B and in the wiring diagram of FIG. 2. In this position, line 320 is grounded to produce a logic 0 at the input of switch 322 and a logic 0 in line 324. This connects cable 62 with leads 64, 66 to starting device 60, best shown in FIG. 3. Consequently, when cable 62 is connected to device 60 and switch 70 is moved to position 76, the starter motor of the internal combustion engine is driven directly by current source 100. This is illustrated best in FIG. 3 using the overall diagram of FIG. 1A. Device 60 is attached to power stud 56 of battery 54 and includes a plastic housing 330 with a mounting clamp 332 to clamp the housing over power stud 56 by forcing the ends of clamp 332 together by bolt 334. Housing 330 also has a fixed post 340 so clamp 342 on lead 64 can be attached to the post by bolt 344, similar to the action of clamp 332. Consequently, housing 330 remains with the battery 54 at all times. When it is necessary to start the internal combustion engine because battery 54 is low, such as during extremely cold temperature, clamp 342 is attached to external fixed post 340 of housing 330. This connects lead 64 to post 340. The post is the input to a bypass switch or circuit 350 having an input 352 from clamp 332 and, thus, power stud 56 of battery 54. Output 354 of circuit or switch 350 is connected inside the housing with a dummy stud 360 permanently fixed by a clamp to lines 362 constituting the input of the electrical system for a motor vehicle. Line 362 goes directly to starter motor 370. The motor is always connected to the dummy stud. When it is necessary to start the engine by operation of motor 370, cable 62 is connected to post 340 of housing 300 and switch 70 is moved to position 76. This immediately starts the engine. Then the clamp 342 is removed and the engine operates. The purpose of bypass switch or circuit 350 is to guarantee that current from power source 100 is directed to the dummy stud 360 and not to the actual power stud 56 of battery 54. During normal operation, bypass switch or circuit 350 merely passes current from stud 56 through lines 352, 354, to dummy stud 360. Thus, with housing 300 assembled onto battery 54 by clamp 332, the battery operates normally. When the battery is low or can not start the engine, clamp 342 of lead 64 from welder W is applied onto post 340 and the starter is driven directly by the welder.

Figure 5:
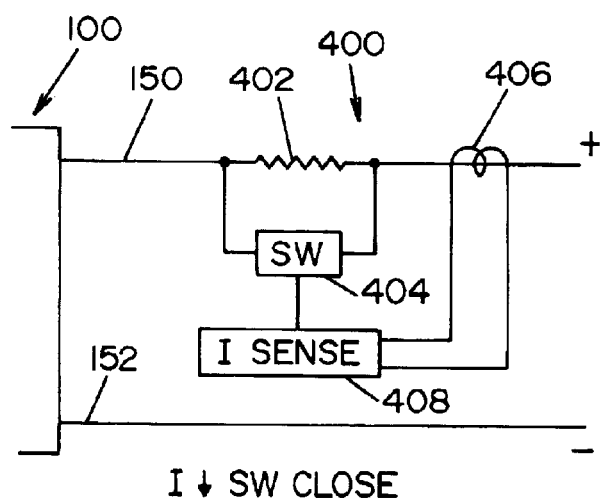

Referring now to FIG. 5, to prevent a spark when clamp 342 is connected to post 340, or at other times, the present invention is provided with a spark inhibitor schematically illustrated as inhibitor 400. A large resistor 402 having an impedance of over about 0.3 Megohm is connected in parallel with switch 404. Current transformer 406 allows circuit 408 to read the current. If there is a short, a small current flows through the resistor. Circuit 408 is set to maintain the switch open when a given amount of current is sensed. When the current reduces or stops to an acceptable level indicating no short, switch 404 is closed to bypass resistor 402. This spark inhibitor need not be used; however, it is anticipated for certain applications.

What is claimed is:

1. In a portable electric arc welder having a power source creating a DC voltage between two output terminals, said welding having a weight of less than 100 pounds and a rating of less than 300 amperes, a voltage feedback circuit to control the voltage between said terminals by a reference voltage signal, and welding output leads for performing a welding operation, the improvement comprising: a battery charger integrated with said welder and connected to said terminals, said battery charger having output leads connectable to a battery having an output voltage of at least about 12 volts DC, said battery charger further having a charging sequence circuit operable by an input enable signal and controlled by conditions of said battery being charged to generate a voltage and/or a current to charge said battery; and, a manual selector switching on said welder and movable between a first position connecting said terminals to said welding output leads and a second position creating said battery charger input enable signal.

2. The improvement as defined in claim 1 wherein said power source is a constant voltage source.

3. An improvement as defined in claim 2 wherein a welding gun with a weld trigger is connected to one of said welding output leads and a circuit for operating said power source when both said trigger is closed and said selector switch is in said first position.

4. The improvement as defined in claim 2 wherein said welder has a wire feeder operable when said selector switch is in said first position.

5. An improvement as defined in claim 1 wherein a welding gun with a weld trigger is connected to one of said welding output leads and a circuit for operating said power source when both said trigger is closed and said selector switch is in said first position.

6. The improvement as defined in claim 1 wherein said welder has a wire feeder operable when said selector switch is in said first position.

7. A portable electric arc welder having a power source creating a DC voltage between two output terminals to drive a welding device and an integrated, internal battery charger with an input stage and an output stage connectable to a battery to be charged, and a selectable switch having a first position connecting said terminals to said welding device and a second position connecting said terminals to said integrated battery charger at a selected location.

8. A portable electric arc welder as defined in claim 7 wherein said power source is a constant voltage source.

9. A portable welder as defined in claim 8 including a spark inhibitor comprising a resistor in one of said output leads with an impedance of at least about 0.3 meg ohms and connected in parallel with a shunt switch, a current sensor for said lead and a circuit to close said shunt switch when said current sensor senses a current below a given value, said value substantially greater than the rated current of said power source but less than twice the rated current of said power source.

10. A portable electric arc welder as defined in claim 7 wherein said selectable switch has a third position, an integral device for actuating a starter motor, said actuating device connected to at least one of said output terminals by a connector and a circuit to close said connector when said selector switch is in said third position to operate said starter motor of an internal combustion engine.

11. A portable welder as defined in claim 10 wherein said power source has a rating of less than 300 amperes.

12. A portable welder as defined in claim 7 wherein said power source has a rating of less than 300 amperes.

13. A portable welder as defined in claim 7 including a spark inhibitor comprising a resistor in one of said output leads with an impedance of at least about 0.3 meg ohms and connected in parallel with a shunt switch, a current sensor for said lead and a circuit to close said shunt switch when said current sensor senses a current below a given value, said value substantially greater than the rated current of said power source but less than twice the rated current of said power source.

* * * * *